United States Patent [19]
Kilper

[11] Patent Number: 4,877,111
[45] Date of Patent: Oct. 31, 1989

[54] CHAIN LUBRICATOR

[75] Inventor: John J. Kilper, St. Louis County, Mo.

[73] Assignee: Alvey, Inc., St. Louis County, Mo.

[21] Appl. No.: 233,813

[22] Filed: Aug. 19, 1988

[51] Int. Cl.[4] .............................................. F16N 1/00
[52] U.S. Cl. ..................................... 184/15.1; 184/12; 184/15.3; 184/6.19; 198/500
[58] Field of Search ..................... 184/15.3, 15.1, 15.2, 184/12, 6.19; 73/9, 10; 198/500

[56] References Cited

U.S. PATENT DOCUMENTS

| | | | |
|---|---|---|---|
| 2,074,373 | 3/1937 | Dayes | 184/18 |
| 3,425,513 | 2/1969 | Fisher et al. | 184/15.1 |
| 3,606,098 | 9/1971 | Genther | 184/15.2 |

Primary Examiner—Ira S. Lazarus
Assistant Examiner—Christopher Hayes
Attorney, Agent, or Firm—Gravely, Lieder & Woodruff

[57] ABSTRACT

An endless chain having a tension and a relaxed non-tension run, and a lubricant delivery control including friction responsive elements to sense the friction condition between the chain and a part of a supporting track and respond on increasing friction to dispense lubricant into the non-tension chain run which is carried to the friction sensing element to eventually reduce the friction and allow the sensor to cut-off lubricant supply.

7 Claims, 2 Drawing Sheets

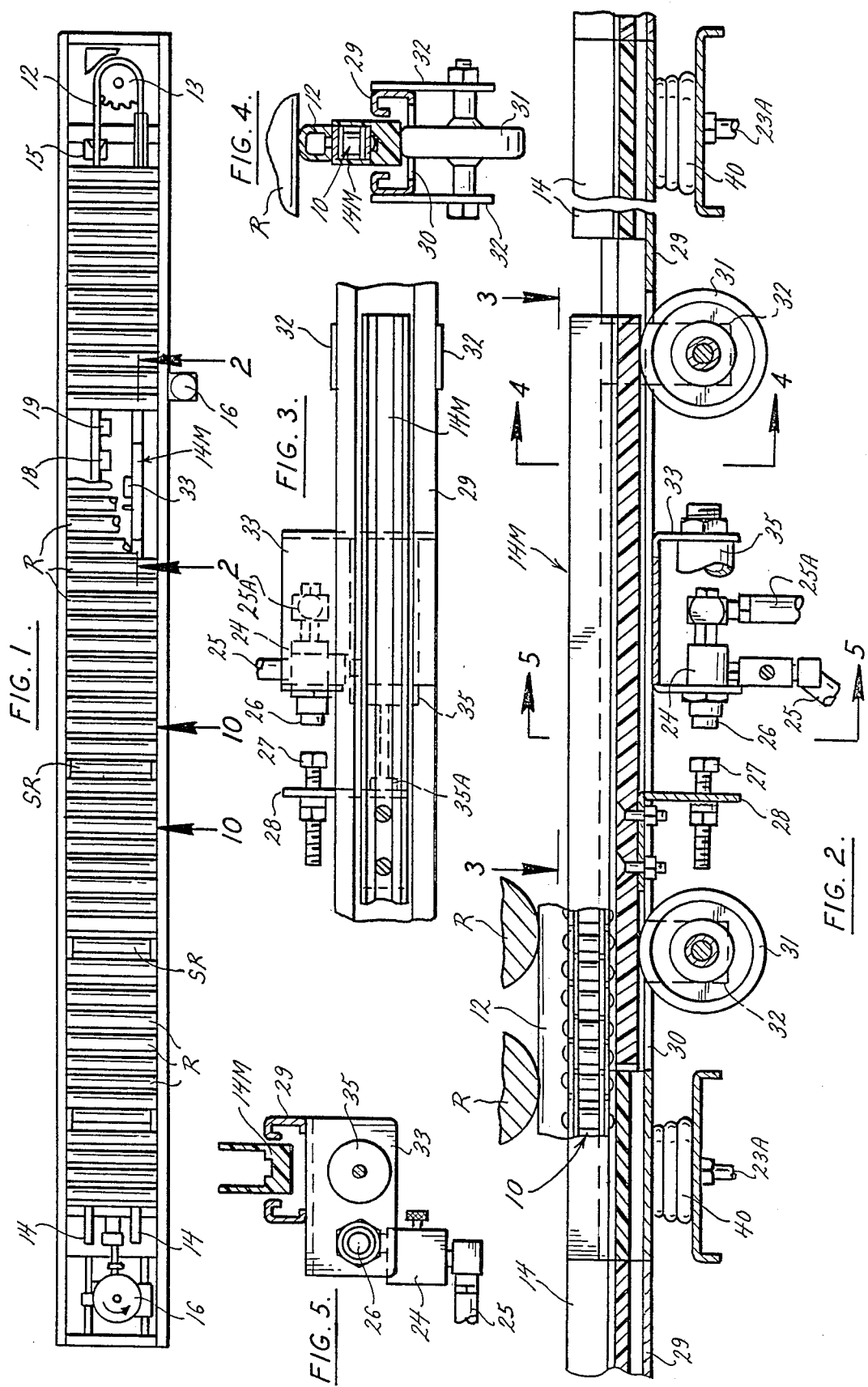

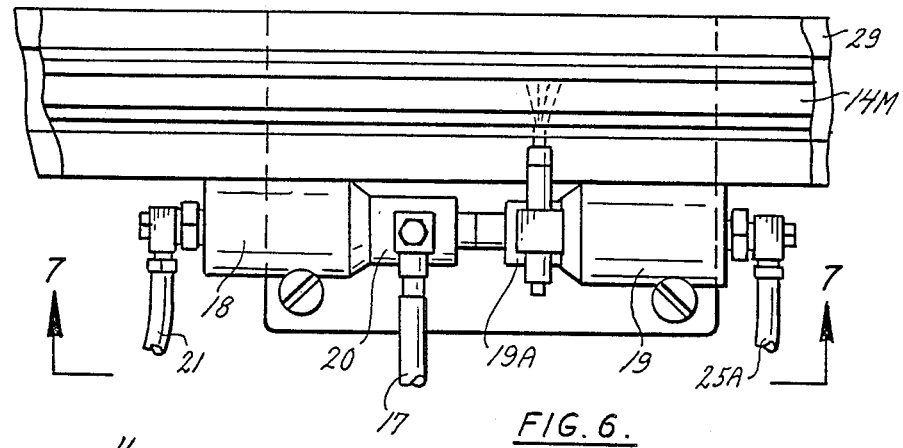
FIG. 6.
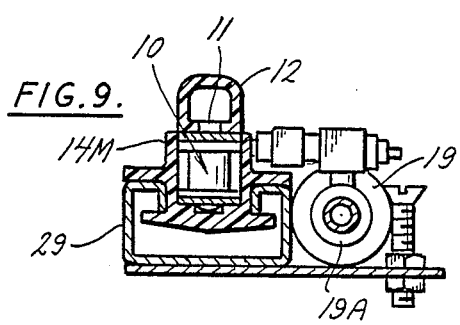
FIG. 9.
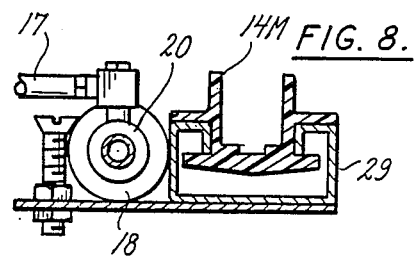
FIG. 8.
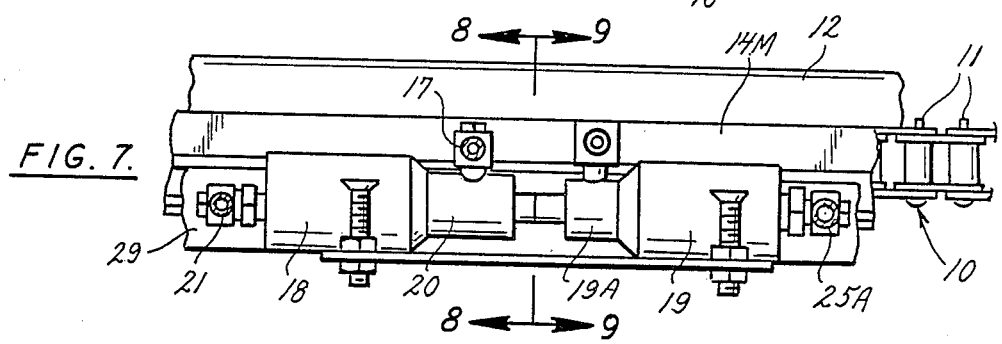
FIG. 7.
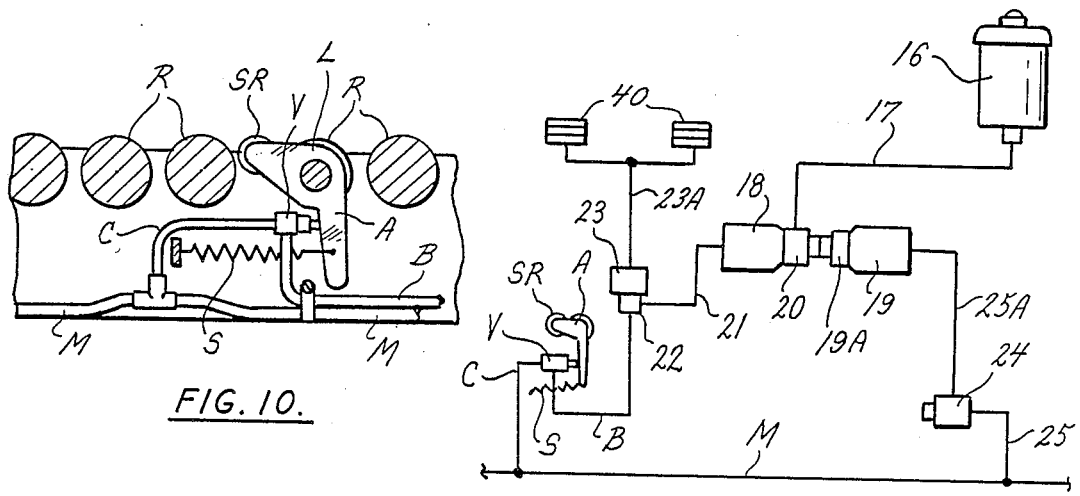
FIG. 10.
FIG. 11.

CHAIN LUBRICATOR

BACKGROUND OF THE INVENTION

1. Field of the Invention

This invention relates to lubrication of drive chains and in particular to those applications where lubrication is critical to the operation, but must be controlled to prevent contamination of materials near the drive chains.

2. Description of the Prior Art

Chain lubricators are commercially available in a variety of configurations ranging from a simple wick that transfers lubricant from a reservoir to the chain through capillary action to an elaborate system that injects lubricant under pressure at pre-determined intervals of time. All of these lubrication methods share a common property of delivering a fixed amount of lubricant over a unit of time. If underlubrication or overlubrication occurs, the rate of delivery can be adjusted manually after the condition is discovered. Many times, however, the condition which warrants manual adjustment is discovered too late and chain damage or environment contamination has already occurred.

3. Brief Description of The Invention

An important object of the present invention is to provide a simple inexpensive but positive lubrication system for properly lubricating a chain drive by sensing friction conditions in the tension side of the chain run and supplying lubricant into the non-tension side of the chain run where the lubricant is most easily picked up in the chain components that are subject to wear.

A further important object of this invention is to obtain satisfactory lubrication in a chain by a unique mechanism which senses sliding friction between the chain and friction sensing means which determines by a predetermined movement whether to dispense more lubricant or withhold the dispensing of lubricant, thereby relying on the ability to translate the sliding friction response into a truly automatic chain lubricator.

A preferred embodiment of the present invention resides in the lubrication control as applied to a driven endless chain that passes the chain from the tension run to the non-tension run, and in which a control is responsive to friction responsive means associated with the tension side of the chain so that the friction condition between the chain and the friction responsive sensing means is able to determine when dispensing a supply of a lubricant for the chain is to occur, such as in response to a predetermined friction level by dispensing lubricant onto the non-tension side of the chain so as to reduce the friction in the chain pins and bushings, or other parts, while preventing the release of excessive quantities of lubricant.

A further embodiment of a chain lubricator system comprises arranging chain guiding channels for supporting the chain in its tension driving run and in its non-tension return run, constantly monitoring the condition of the friction between the chain run through a movable section of the guide channel to determine when to deliver lubricant, as well as the frequency of delivery into the guide channel on the non-tension run of the chain, thereby reducing the amount of friction in the system between the chain and the guide channel.

Where previous lubricators depend on manual adjustment and feedback adjustment in order to perform satisfactorily, this invention employs the sensing of sliding friction between the chain and a friction sensing device that moves in response to friction in order to determine whether to dispense more lubricant or not. While not only eliminating the manual adjusting and readjustment, this invention senses the friction conditions on a continuous basis to make it a truly automatic lubricator. The problem heretofore encountered in connection with chain drives of various guides has been the lack of proper lubrication on a basis that avoids the extremes of too little lubrication or too much lubrication. That problem is overcome by the present invention in regulating the supply of lubrication while the chain is in operation, and providing assurances that while the chain is not operating, lubrication will not be supplied.

BRIEF DESCRIPTION OF THE DRAWINGS

The present invention is disclosed in the following drawing views, wherein:

FIG. 1 is a schematic plan view of a conveyor of package moving type having rollers driven by a chain disposed beneath the rollers, and a series of spaced package sensing rolls that are operative when the conveyor is running;

FIG. 2 is a fragmentary side elevation of a friction sensing mechanism which is inserted in a signal generating system, the view being taken along line 2—2 in FIG. 1;

FIG. 3 is a fragmentary portion, in plan view, of the friction sensing means as seen along 3—3 in FIG. 2;

FIG. 4 is a transverse sectional elevation, the view being taken along line 4—4 in FIG. 2;

FIG. 5 is a transverse sectional view of the mechanism taken along line 5—5 in FIG. 2;

FIG. 6 is a fragmentary view on an enlarged scale of the lubricant delivery control arrangement as seen in plan view indicated by reference characters similarly denoted in FIG. 1;

FIG. 7 is a view taken along line 7—7 in FIG. 6;

FIG. 8 is a cross section along line 8—8 in FIG. 7;

FIG. 9 is a cross section along line 9—9 in FIG. 7;

FIG. 10 is a fragmentary elevational view of a sensor mechanism which is responsive to the movement of packages on the conveyor, the view being taken along line 10—10 in FIG. 1; and FIG. 11 is a schematic control circuit for the lubricator means of this invention.

DETAILED DESCRIPTION OF A PREFERRED EMBODIMENT

The present invention is applicable to a chain type conveyor drive in which a chain 10, seen in FIG. 7, is oriented with its link pivots 11 set in a vertical direction so that the chain can traverse curves to the right or left of a straight run. The chain is adapted to be equipped with a suitable friction drive, such as a plastic element 12, which is carried on top of the chain and presents a friction surface to the load carrying rollers R which are driven by contact with the plastic drive element 12, as seen in FIG. 2. In the view of FIG. 1 it can be seen that the roller conveyor assembly is equipped with a series of sensor rollers SR, each of which is normally elevated above the conveyor plane so that packages moved by the rollers R will pass over each sensor roller and depress such roller for a purpose to be referred to.

FIG. 1 is a fragmentary portion of a conveyor assembly of the character with which the present invention is associated. The conveyor assembly has side rails which support the series of package supporting rollers R in a manner well understood in the art. The rollers R are arranged in groups of a predetermined number of rollers, and the groups are separated by the sensing rollers SR, one being seen in FIG. 10. The sensing roller SR is pivotally mounted on the shaft of a plain roller R which essentially matched the rollers in each group. The sensing roller SR is mounted on a bell-crank lever L having an actuator arm A which is normally held in a position with the sensing roller SR raised above the plane of travel of packages on the rollers R by an adjustable spring means S. The arm A engages the plunger of a sensor valve V which is inserted in a compressed air system, wherein a compressed air branch conduit C is connected to a supply main M to bring air into a branch conduit B to direct air pressure to devices in a control assembly to be described. When a package depresses the sensor roller SR, air pressure is cut off from branch B by the closing of the sensor valve V and the automatic opening on an air exhaust outlet associated with the line B.

FIG. 2 is an enlarged side view partly in section of the friction sensor assembly for controlling lubricant supply to the non-tension side of a conveyor chain represented by the plastic friction means 12. The counter clockwise direction of rotation of the sprocket 13 (FIG. 1) pulls the chain cover means 12 in tension along a guide channel 14. Since the chain must follow a curved path, it is installed with the pivot pins interconnecting the chain links set in vertical positions (FIG. 7). The pivot pins project above the links and are adapted to engage in the flexible plastic element 12 which engages the package rollers from below. The element 12 may be formed from polyurethane or similar material which has a desirable friction contact on the rollers R to move packages in a direction on top of the rollers opposite to the chain travel direction. After the chain is pulled around the sprocket 13 it becomes non-tension as it enters the return channel guide 15 and continues on until it passes around an idler sprocket 16 and reenters the guide channel 14 well downstream from the lubricating assembly now to be referred to in the following drawings of FIGS. 2-9.

The lubricating control provisions relate to a source of lubricant in a suitable reservoir 16 having a gravity feed conduit 17 which is connected to an outlet fitting 20 between a pair of valves 18 and 19. While a gravity feed is simple, the reservoir 16 could be a pressurized container for more positive delivery of lubricant. The valve 18 is connected by a conduit 21 to a connector junction 22 associated with a speed control valve 23 (FIG. 11). There is a lubricant delivery control device comprised of a normally closed pressure air valve 24 connected by a pressure supply conduit 25 into the pressure air supply manifold M (previously referred to in FIG. 2). The valve 24 has an actuation plunger 26 which is contacted in a predetermined manner by a tappet 27 adjustably carried by a bracket 28 of the chain directing channel 14.

As seen in FIGS. 2-5, the channel 14 is supported in a substantially rigid track 29. A portion of the channel 14 is separated into a movable friction sensing means in the form of channel 14M that slides in the track 29. The track 29 is slotted at 30 in its bottom wall for the reception of the periphery of wheels 31. The wheels 31 are supported by brackets 32 secured to the sides of the track 29 so the peripheral surfaces extend into the track slots 30 and support the movable friction sensing means 14M so it is substantially free of frictional contact in the track. A bracket 33 (FIG. 2) carried by the track 29 supports a dashpot 35 and the normally closed air valve 24. Moreover, since the track 29 is slotted in its bottom wall, a bracket 28 can extend through the slot and be secured to the movable section of the channel 14M. That bracket 28 carries the tappet 27 which presents its head in line with the plunger 26 of the air valve 24. The tappet is positionally adjustable to engage the plunger 26 upon a predetermined amount of friction sensing movement of the channel 14M in track 29.

Reference is directed to FIG. 6 which shows, in enlarged size, the assembly of the normally open valve 18 affixed to the track 14, a normally closed valve 19 and the means 20 interconnected with and located between the valves 18 and 19. The means 20 is intended to allow lubricant to pass to an outlet fitting 19A to release lubricant into the path of the non-tension chain run in channel 14. The lubricant released by the fitting 19A is picked up by the chain to lubricate the link bushings and pins. The lubricant is carried by the chain in the channel 14 and around the idler sprocket 16 (FIG. 1) and back into the channel 14, and eventually to the sliding sensor channel 14M. If the friction of the chain in the channel 14M exceeds a predetermined amount, the channel will be dragged along and the tappet 27 moved with it can depress plunger 26 to open the normally closed valve 24. Air pressure from the conduit 25 connected to the manifold M is released into conduit 25A to open the normally closed valve 19. That action of valve 19 opens the lubricant outlet fitting 19A. However, no lubricant is released until the air under pressure in line 21 is exhausted to allow the valve 18 to open. It is realized that the valve 18 is opened periodically upon each package, exhausting air from conduit B and also conduit 21 by depressing sensor roller SR (see FIG. 10).

It is observed (FIG. 11) that when air pressure is admitted to conduit B, it passes through the speed control valve 23 to pressurize the conduit 23A, and the latter conduit 23A is divided so it is connected to a pair of bellows 40 (FIG. 2) which raise the track 29 so the roller chain driver element 12 is pressed up against the package carrying rollers R to assure the sensing of the chain 10 sliding in the movable channel 14 to measure the lubrication condition of the chain. If there is adequate lubricant on the chain links, the channel 14M will be restrained from moving the tappet 27 to depress the plunger 26 in valve 24. That restraint (FIGS. 2 and 3) is exerted on the bracket 28 by the plunger 35A of the dashpot 35. When the lubricant is inadequate, the friction will increase the chain drag on the sensor 14M which will move it along until the tappet 27 depresses the plunger 26 and opens valve 24 to allow air pressure to pass to conduit 25A to open the normally closed valve 19. When the valve 19 opens, lubricant will pass through the outlet valve 19A. To get a supply of lubricant into the channel 14, the conveyor must be operating so the friction sensor means 14M can be moved in the channel 29 to determine if and when the valve 24 should be opened to pressurize valve 19.

The control system for this invention is depicted in FIG. 11. It is assumed that the conveyor chain 10 is operating so that the sprocket 13 in FIG. 1 is rotating to drag the chain through the channel 14 which is guided by means 29. It is assumed that a supply of lubricant is in the reservoir 16 (or an equivalent source), and that the air pressure conduit M is activated. If the chain is not properly lubricated, the friction sensing movable channel 14M will be dragged along to have the tappet 27 depress the plunger 26 of valve 24 so that a supply of air pressure from line M can pass valve 24 and into line 25A to open normally closed valve 19 which opens the fitting 19A. However, no lubricant is deliverable until a normally open valve 18, which is held closed by the air pressure in conduit 21, is opened. The opening of the valve means 18 conditions the means 20 to allow lubricant to pass to the fitting 19A. That condition is established by the position of the sensor lever A & FIG. 10 being in a position to raise the sensor roller SR and open the valve V to allow pressure air into conduit B and to the fitting 22 as well as into speed control valve 23. The air passing speed control valve 23 expands the bellows 40 which raise the guide 29 and that, in turn, raises the chain carried drive element 12 to drive the package carrying rollers R (See FIG. 2). Now, when a package (not shown) depresses the sensor roller SR the valve V is closed and its air exhaust side is opened to allow exhaust of air from conduit B and conduit 21. The exhaust of air from line 21 allows valve 18 to open means 20 and lubricant passes into fitting 19A and delivery of lubricant into the channel 14 occurs. When the package clears the sensor roller SR the compressed air is redelivered to line 21 and that interrupts further delivery of lubricant by closing valve 18.

Should the first delivery of lubricant not be sufficient, the friction sensor means 14M will continue to hold the tappet 27 against the plunger 26 and that holds valve 24 open so air pressure can hold normally closed valve 19 open. Thus, each time a package passes the sensor roll SR and depresses it, the air pressure in conduit 21 is exhausted and valve 18 goes to its normally open position. The periodic operation of the sensor roller SR will deliver lubricant to the chain channel 14 until the lubricant is adequate to allow the dashpot plunger 35A to prevent the tappet 27 from depressing the plunger to open the normally closed valve 24. This allows the valve 24 to remain normally closed and that stops the delivery of lubricant because fitting 19A is closed by normally closed valve 19. Valve 24 will remain closed until the friction again drags sensor tappet to open valve 24.

In accordance with the foregoing description, the present invention is directed to an endless chain drive provided with lubrication control. The endless chain is normally operated with one side of a run under tension and the opposite side free of tension so that when lubrication is called for it will be admitted to the non-tension run of the endless chain where it can easily enter the components of the chain because the components are not in tight abutment as would be the case with the chain components under tension. The endless chain is supported in a track and friction responsive sensor means is operative in the track supporting the tension run of the endless chain so that control response can be predicated on the friction condition signalled by the responsive sensor to operate the delivery of a lubricant from a source to the non-tension run of the endless chain.

What is claimed is:

1. An endless chain drive with lubrication supply control; comprising:
    (a) an endless chain having a tension run and a non-tension run;
    (b) motor driven means to drive said endless chain;
    (c) friction sensing means mounted adjacent said endless chain in position to engage with and move in response to a predetermined value of the friction developed by the engagement therewith;
    (d) a source of lubrication connected to normally closed valve means, the opening of said valve being capable of dispensing lubricant onto said chain; and
    (e) control means responsive to the operation of said motor means to said endless chain and also responsive to the movement of said friction sensing means responsive to said predetermined value in the friction between said chain and said movable friction sensing means for opening said valve means and effecting the dispensing of lubricant onto said chain whereby the dispensed lubricant reduces the friction value below said predetermined value of the friction and said control means allows said normally closed valve means to close and discontinue dispensing lubricant.

2. The endless chain drive set forth in claim 1 wherein said sensing means includes a movable chain guide and means to translate the movement of said chain guide to indicate the value of the friction between said chain and said guide means.

3. The endless chain drive set forth in claim 1 wherein said control means includes means for conditioning said normally closed valve means to dispense lubricant upon the attainment of said predetermined value of friction.

4. The endless chain drive set forth in claim 3 wherein said means for conditioning said valve means to dispense lubricant is responsive to the movement of the endless chain.

5. The endless chain drive set forth in claim 1 wherein the movement of said friction sensing means is substantially friction free whereby the sensing of the friction is substantially limited to the friction between said chain and said friction sensing means.

6. In a chain lubricating system, the combination comprising:
    (a) a chain movable in an endless path and having a tension run and a non-tension run, said chain powered by a drive means for placing the chain in operation;
    (b) lubricant dispensing means adjacent the movable chain including normally open and normally closed valve means operatively connected to the dispensing means;
    (c) a source of lubricant connected to said dispensing means;
    (d) friction sensing means operatively disposed adjacent said chain, said friction sensing means being operative to sense the condition of the friction value between said chain and said friction sensing means, and said friction sensing means being movable by said chain upon a predetermined increase in the value of the friction sensed thereby;
    (e) a lubricant dispensing control means responsive to the operation of said chain drive means;
    (f) a source of pressure fluid connected into said normally open valve means for closing said valve means to prevent dispensing of lubricant;
    (g) a second normally closed valve means connected into said source of pressure fluid and having a pressure fluid transmitting connection to said first mentioned normally closed valve means for opening the same; and
    (h) means in said friction sensing means in position to open said second normally closed valve means to enable pressure fluid transmission to open said first mentioned normally closed valve means and enable said lubricant dispensing means to dispense lubricant upon said non-tension run of said chain upon the attainment of the predetermined increase in the value of the friction sensed by said friction sensing means.

7. The combination set forth in claim 6 wherein said control means is periodically operable to initiate lubricant dispension.

* * * * *